Figure 1:
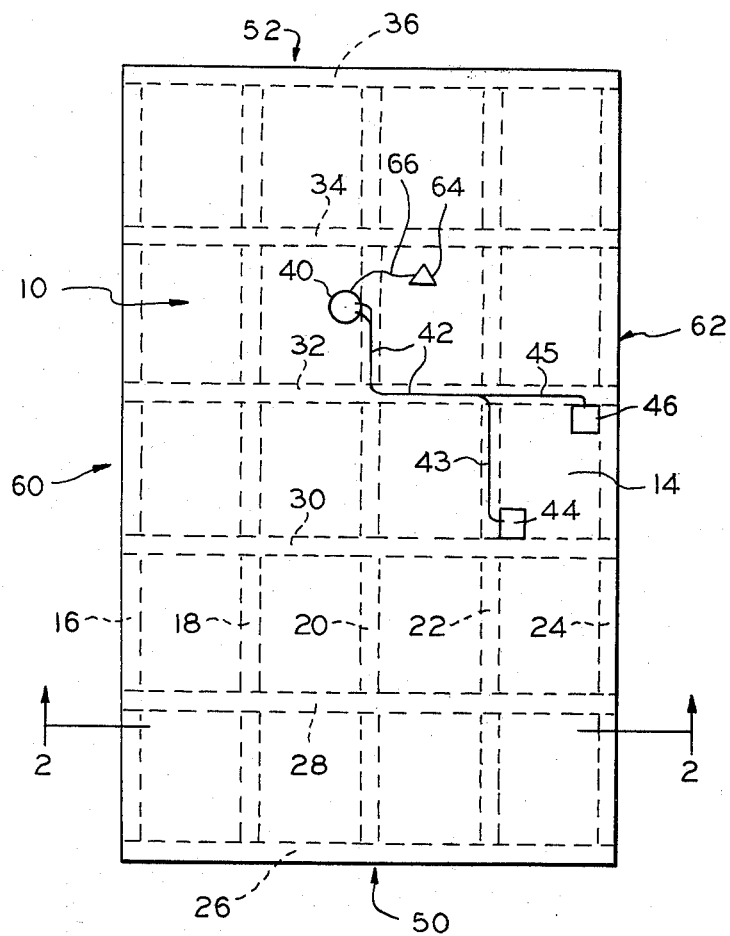

United States Patent [19]

Davis

[11] 4,317,996
[45] Mar. 2, 1982

[54] METHODS FOR DETECTION OF ROOF LEAKS AND AREAS OR ZONES OF THE LEAKAGE

[75] Inventor: Robert E. Davis, Hinsdale, Ill.

[73] Assignee: R. E. Davis Chemical Corporation, Oak Brook, Ill.

[21] Appl. No.: 111,872

[22] Filed: Jan. 14, 1980

[51] Int. Cl.$^3$ ............................................. G09K 3/00
[52] U.S. Cl. ................................................. 250/302
[58] Field of Search ................ 250/302, 358 R, 361 R

[56] References Cited

U.S. PATENT DOCUMENTS 2,516,857  8/1950  DeForest et al. .................. 250/302
3,975,634  8/1976  Molina ............................... 250/302

OTHER PUBLICATIONS

"Tracer-Tech.", Uresco, 1965, 250-302.

Primary Examiner—Bruce C. Anderson
Attorney, Agent, or Firm—Keil & Witherspoon

[57] ABSTRACT

Methods for detection of the presence or absence of water leaks in building roofs and for tracing any leaks to the zone or area thereof in the roof by applying on all or part of the roof fluorescent dye-containing water, shining a fluorescence-inducing light, e.g., actinic or U/V light, onto the underside of the roof, its support structures, roof-penetrating structures and/or surfaces of walls beneath the roof, tracing the path or paths of fluorescence (if present) along the underside of said roof, and/or roof-penetrating structures, and/or roof support structures, and/or the building wall(s) to or near the point of origin of the area or zone of water leakage through said roof, and optionally applying the fluorescent dye-containing water onto the roof in the form of a spray in a fast-moving air stream or as a water jet or jet-spray to simulate wind-driven rain.

9 Claims, 2 Drawing Figures

METHODS FOR DETECTION OF ROOF LEAKS AND AREAS OR ZONES OF THE LEAKAGE

BRIEF STATEMENT OF THE INVENTION

The subject invention relates to inspections of roofs of buildings and/or joints thereof with appurtenant structures such as peripheral parapets, retaining walls, upwardly-extended building outer wall portions, etc.; ventilators; chimneys and stacks; elevator penthouses; and the like (a) to detect the presence or absence of water leakage through the roof itself or joints thereof with appurtenant roof structures on or extending through the roof and/or (b) to trace the path of flow inside the building of leaked water to an area or zone at or near the origin of the leakage through the roof or said joints to detect the area or zone in need of repair. Water containing a fluorescent dye dissolved or dispersed therein is poured, sprayed or otherwise doused onto the entire roof or onto preselected areas or joints thereof in an amount to reasonably assure that the water will flow through any leaks in the roof or its joints into the building, where it runs onto and/or along surfaces such as the underside of the roof; the underlying roof support structures; components inside the building which project through or penetrate the roof, e.g., ventilators, chimneys, stacks, roof window lights, trap doors, etc.; and/or surfaces of interior or exterior walls of the building. The path of the leaked water (if present) is traced back to or near the point of origin of the leak by shining a light which induces fluorescence of the dye in the path of the leaked water, e.g., actinic light covering all or part of the visible and U/V spectrum, U/V or black light, etc.; and tracing the path of fluorescence along the underside of said roof, and/or roof-penetrating structures, and/or roof support structures and/or the building wall to or near the point of origin of the area or zone of water leakage through said roof.

All or part of the leak detection method and/or roof inspection method (for presence or absence of water leakage) may be carried out in conditions simulating wind-driven rain. Here the fluorescent dye-containing water is injected into or sprayed as droplets into a directed, fast moving stream of air. The stream of air containing droplets of the dye-containing water, preferably at an air velocity of at least 20 miles per hour, is directed against a segment (or progressive segments) of the roof and/or its joints, thereby driving droplets of the dye-containing water against the roof, its joints, and roof-contiguous parts of appurtenant structures to simulate the action of wind-driven rain. Preferably, to minimize entrainment of the droplets of the dye-containing water in the atmosphere, the air nozzle and the area being tested by impingement thereon of the airstream are hooded, e.g., by a light, portable hood with flexible side walls which lie on and conform to the roof and particularly its appurtenant structures.

Alternatively, wind-driven rain can be simulated by spraying a jet, jets, or droplets of the dye-containing water against the area or progressive areas being tested. Here again, hooding of the spray nozzle and the area being tested is recommended.

STATE OF THE ART

Roof leakage and repair of such leakage are often perplexing, aggravating problems to the roofing contractor and to the building owner or manager. As many homeowners have been made aware by roof-leaked water dripping from a ceiling electrical fixture one or more stories below the roof, water which has leaked through a roof follows unexpected, difficult-to-trace paths along the underside of the roof, rafters or other support structures, and hidden building structural components and hidden parts such as plumbing lines, electrical conduits, etc., inside building walls and between ceilings and floors before the water finally emerges in visible form by dripping, running, wetting areas of ceilings or walls, etc. The same types of perplexing flow of roof-leaked water occurs in other residential and non-residential buildings, e.g., industrial factories, warehouses, commercial buildings such as stores, shopping centers, office buildings, automobile and/or gasoline service buildings, apartment buildings, apartment/office complexes, etc. Many, perhaps most, of these buildings have flat roofs or roofs with only a small pitch of 1/12 or less. Even here, where one would expect the visible signs of roof leakage inside the building to be exactly or almost directly below the area or zone of leakage, experience has proven that the expected is often not the case—the leaked water having taken an unexpected lateral or lateral/downward path along the underside of the roof, its underlying support structures, roof-penetrating structures and/or building walls before it finally emerges at a place laterally disposed from the origin of the roof leak.

Roof leaks have been and are detected and traced (a) by examining the upper surface of the roof, roof joints, roof flashing, etc. for visible signs of roof damage or faulty installation, (b) by examining by sight and feel the underside of the roof, its supporting structures, roof-penetrating structures, and building wall structures for wetted surfaces back to what appears to be the point of origin of the leak—particularly after a moderate to heavy rain or during melting of roof ice or snow; and (c) examining the structures listed in (b), supra, for stains left by dirt, rust, etc. carried by the leaked water and left after its evaporation—a procedure which is successful only where the leakage has existed for a substantial period of time. None of these past and present procedures are totally satisfactory. They often fail to detect the real cause of the leakage or even the area or zone of origin of the leak due principally to human inability to find and/or interpret the visible signs underlying the actual leakage problem.

Roof inspection methods to determine the presence or absence of roof leakage, other than by visual inspection of the roof, its joints, its flashings, etc., have been essentially ignored to date. A reliable inspection method, which can be performed relatively inexpensively, is needed by roofing contractors for checking and/or certifying new roof installations and/or roof repairs, improvements, changes, and/or rehabilitations. General contractors and building owners also need such a method of inspection to verify that a roofing contractor's performance and/or certification meet specifications before payment is made to the roofing contractor. The methods of the subject invention meet these needs because the roof, its joints, its flashings, etc. can be checked in less than a day for water-tightness and at a reasonable cost for the testing. If leaks are detected, their origin can be quickly pinpointed, in most cases with little additional work on the part of the roof testing service personnel, by the tracing techniques aforedescribed.

It is believed that the basic concepts of the invention will be understood from the foregoing description and from the following description of preferred embodiments of the testing and inspection methods, fluorescent dyes, and adjunct procedures set forth in the following section, which together with the accompanying drawings, illustrated preferred modes of practice of the invention.

Figure 2:
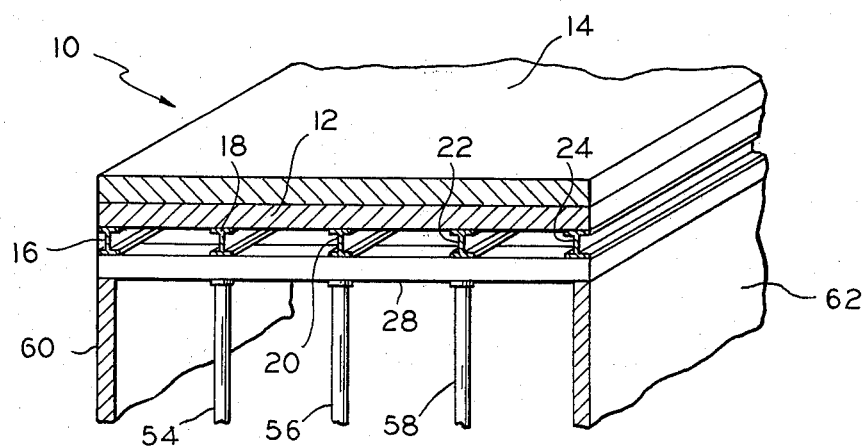

PREFERRED MODES AND EMBODIMENTS IN THE DRAWINGS:

FIG. 1 is a top plan view of a flat roof building with a hypothetical, illustrative zone of water leakage in the roof and two hypothetical flow paths of leaked water within the building; and FIG. 2 is a fragmentary, isometric sectional view taken on section plane 2—2 of FIG. 1, with the side trim of the roof edges removed.

LEAK DETECTION

Referring to the drawings, the flat roof 10 of the illustrated building is composed of an underlying, roof base structure 12 composed of one or more thicknesses of sheets, panels, etc., of steel, prestressed concrete, etc. The structure 12, usually in itself not water tight, is overlaid with an exteriorly exposed, upper layer or layers 14 of weatherproof, water tight roofing material. The commonly used roofing materials for flat or low pitch roofs are pitch, tar, and asphalt, which are usually poured and spread over tar paper, vinyl or other plastic, or other rolled roofing material laid in parallel, overlapping bands on the roof base structure 12.

The roof supporting structure comprises a series of longitudinal, parallel I-beams 16, 18, 20, 22 and 24 and a series of underlying, parallel lateral, cross I-beams 26, 28, 30, 32, 34, 36 and 38. The roof base structure rests on and is attached to the longitudinal beams, while the latter rest on the cross beams. Cross beams 26 and 36 rest on and are supported by the load-bearing front and rear walls 50,52 of the building. They, however, like cross beams 28, 30, 32 and 34, may be supported in their midportions by support posts or beams 54, 56, and 58 and at their ends by the load-bearing, side walls 60 and 62.

Referring to FIG. 1, a hypothetical leak has occurred in the layer or layers 14 in the zone 40. The leaking water travels along the upper or lower side of the panel or sheet support structure 12 and then onto and along longitudinal beam 22 and then along cross beam 32 in the path 42. All or part may continue along path 45 of the cross beam 32 to the vicinity 46 of the wall 62, on the inner side of which it begins an essentially downwardly flow along the wall's interior surface (which may or may not be exposed to ready view.)

In this hypothetical case, all or part of the water may shift from path 46 on the lower, cross beam 32 in a path 43 along the underside or edge of the upper, longitudinal beam 22 (because of its slight downward pitch), on which beam it travels to the zone 44 at the next, cross beam 30 to the floor of the building. The immediately visible signs of roof leakage are the water drippings in zone 44 at the juncture of beams 30 and 22 and/or the wetting of the wall 62 at zone 46. In neither case is it evident that the leak originated in the zone 40.

The leak detection methods of the invention involve first visually inspecting the roof 10 (its exterior layer(s) 14, its joints, its flashings, etc.) for signs of damage or faulty installation. If, for example, cracks were found in the surface of the layer(s) 14 in the zone 40, the preferred procedure is to dam an area about zone 40, e.g., with sand; pour water containing the fluorescent dye in the dammed area to a depth of ¼ to one inch; allowing time for the dammed water to flow through the suspected leak into the interior of the building; and scanning the understructures of the building with actinic light, U/V or black light, etc., to ascertain the presence of fluorescence on such understructures. It detected, the leak in the suspected zone 40 is confirmed.

Where no fluorescence on the understructures is observed, the damming about zone 40 is scattered or removed, and the roof is sprayed, doused, etc. with the fluorescent dye-containing water, the building's understructure (including the underside of the roof) is examined by shining actinic light, U/V or black light thereon, and the fluorescence noted is traced back to its initial appearance inside the building. Here it is worthy of mention that the understructures preferably are examined in semi-darkness or darkness in order to attain the best circumstances for contrast between understructure background and the fluorescent dye, be it one which fluoresces in the visible spectrum or the U/V spectrum. However, if the roof's underside and the building's understructures are colored black, brown or other dark, visible light-absorbing color, the methods could be practiced with the building's interior lighted by sunlight and/or interior lighting—particularly where the dye fluoresces under concentrated visible light and/or U/V light in a light color which contrasts sharply with the dark background of the understructures, e.g., brilliant yellow, light green, light blue, brilliant orange, white, etc.

If there is a roof leak, as aforedescribed, but dye-containing water applied to the zone 40 has not appeared inside the building, dye-containing water is applied to the whole roof, or to progressive zones thereof, one by one, until dye-containing water is observed within the building. If dye-containing water still is not observed within the building, one of the methods aforedescribed for simulating wind-driven rain may be used to check, in particular, roof joints, roof flashings, etc.

TRACING THE LEAKED WATER

The best technique for tracing the path(s) of leaked water within the building is carried out in darkness or semi-darkness, in which the fluorescence of the dye is most readily observed. The fluoresced color of the dye preferably is one which will contrast sharply with the color of the underside of the roof and with the color(s) of the roof support structures, the segments of roof-penetrating structures within the building, and the surfaces of the building walls—i.e., a dark fluoresced color (deep or navy blue, deep or brilliant red, dark green, purple, or even brilliant orange, etc.) for light colored surfaces and a light fluoresced color (brilliant yellow, light blue, light green, brilliant orange, pink, etc.) for dark colored surfaces.

A dye which fluoresces under U/V or black light is the most preferred because the building's interior can be scanned in total or semi-darkness—conditions under which the dye's fluorescence is most readily seen and traced. Next preferred are the visible light-fluoresced dyes, which if contrasted with the color of the building's interior surfaces, can be seen on exposed surfaces in sunlight or artificial light. However, as with U/V or black light, the fluorescent path(s) of is/are most easily traced, especially on surfaces not readily observed from a distance, in total or semi-darkness.

Where the observation and tracing of the fluorescent path(s) can be done in essentially total darkness, the fluorescent dye may be a water soluble or water dispersible phosphorescent material—one which glows in the darkness without stimulation of actinic light, visible light, U/V or black light, etc. Such phosphorescent material may be used alone or in admixture with a dye which fluoresces under actinic light, visible light, U/V or black light, etc.

The tracing of the fluorescent path inside the building may be simple, especially when a segment of the underside of the roof which is openly exposed to view has clearly visible fluorescence. Where, however, this is not the case, a close inspection with shined actinic, visible or U/V or black light (e.g., as a small beam from a flashlight, small spotlight, etc.) is usually required. Preferably the inspection begins with the structures or walls adjacent or on which the leakage was first observed, e.g., the zone(s) 44 and/or 46, and traces the fluorescent path back along the beams and roof underside to the beginning of the fluorescent path.

The fluoresced path is not always continuous. It might be interrupted where the water flows between touching or closely adjacent surfaces at the junctures of the beams 16-24 and 26-36 or between touching or closely adjacent surfaces of the beams 16-24 and the underside of the roof structure 12. Hence, when an apparent beginning of the back-traced fluorescent path is noted, careful examination of the beams and roof underside surfaces for several feet about the apparent beginning of the path is in order to ascertain any evidence of an upstream segment of the water path—e.g., by checking for additional fluorescence, signs of wetted surfaces, etc.

Even when the actual beginning of the water path inside the building is found, the task of locating the source of the leak on or in the roof itself is not necessarily finished—unless, of course, the dye-containing water was applied only to a small zone already suspected to be the source of the problem. Leak water beginning with zone 40 inside the building could come from a leak in the roof directly above the zone or from another area laterally removed therefrom. For example, let it be assumed, again hypothetically, that the leakage problem originates in the zone 64 of the upper layer(s) 14 of the roof 10. The water then takes path 66 along the upper surface of a panel or sheet of the roof's base structure 12, and then through a crack or space between two panels or sheets of the base structure, where the water emerges in zone 40. Obviously the fluorescent path 66 is not visible to the naked eye. However, cracks might be noticed in zone 64 of the layer 14 by careful inspection of the roof about the area immediately above the zone 40. If a suspected origin of leakage is not observed, then the layer 14 above and about zone 40 can be stripped away carefully, preferably at night, in an attempt to find and trace the fluorescent path left by the dye-containing, wetted upper surface of the roof's base structure 12, the tar paper or vinyl sheeting laid thereon, and/or the undersurface of the stripped away layer 12.

Alternatively, small zones above and about the zone 40 can be dammed successively with sand dikes or the like and successively flooded with water containing a fluorescent dye or even a brightly colored, non-fluorescent dye, in either case of a color different from the color of the first used fluorescent dye. If the second color appears on the underside of the roof in zone 40, this confirms the origin(s) of leakage to be within the dammed zone on the roof.

ROOF INSPECTION

A new roof can be inspected for leaks by spraying or flooding the entire roof, or successive segments thereof, with fluorescent dye-containing water, and thereafter checking, preferably with a beam of actinic light, visible light, U/V or black light (whichever best induces fluorescence of the dye) in otherwise total or semi-darkness, the entire underside of the roof, its support structures, roof-penetrating structures, and all wall surfaces (including exterior surfaces of outside walls) near the roof for presence or absence of fluorescence. If fluorescence is observed anywhere, the procedures above outlined for roof leak detection are instituted. Where desired, the wind-driven rain simulation procedures, described above, may be used to check, in particular, water tightness of roof joints and/or flashings for roof-bearing structures, roof-penetrating structures, parapets, peripheral walls or roof side trim, etc.

THE FLUORESCENT DYES

The choice of particular fluorescent dyes and/or water-dispersant aids therefor for the practice of the invention can be made from existing, readily available trade literature. For environmental reasons, the dyes and any other chemicals added to the test water, especially where run-off or disposal into a sewerage system or onto the ground is an actual fact or a potential risk, should be bio-degradable. Reference is made to U.S. Pat. No. 3,975,634, the disclosure of which is incorporated herein by reference, for examples of suitable fluorescent dyes an nonionic, biodegradable surfactants which serve as dye solubilizers and/or dye dispersants in aqueous media. In this patent, a fluorescent dye in the non-ionic, bio-degradable liquid surfactant is applied to the surface of a panel or the like; the dye and surfactant are washed away with water, leaving behind in cracks or other flaws in the surface a residual amount of fluorescent dye; and scanning the washed surface under visible or white light or under U/V or black light to detect the cracks or other flaws by the observation of fluorescent lines in the surface.

PITCHED, DOMED AND ARCHED ROOFS

Flat or slightly pitched roofs best lend themselves to the roof leak detection and roof leak inspection methods of this invention because dye-containing water used to douse or flood the entire roof or any segment thereof stands quiescently or runs only slowly to the water run-off system for the roof. This allows time for the dye-containing water to penetrate any areas or zones of leakage without necessity of constant replenishment of fresh or recycled dye-containing water to the roof. With domed or arched roofs and with pitched roofs (e.g, gabled roofs, shed roofs, hip roofs, etc.), however, the applied dye-containing water runs quickly down the roof to the water-run off system, e.g., gutters and downspouts. Here, three special precautions are recommended. First, the run-off, dye-containing water should be collected and not allowed to flow onto the ground or into a sewerage system. Second, the collected run off dye-containing water should be recycled back onto the roof to have constant flow of water thereon. Third, a water distribution unit, e.g., a sprinkle nozzle or a 360° spray head, a perforated or multi-nozzle tube or a perforated hose, etc., should be placed on the apex (domed roofs), along the apex (crowned, gabled, hip, etc. roofs) or along the highest edge (shed roofs) to provide a uniform flooding of the roof's surface by the recycled water.

The latter two precautions will assure a reasonable exposure of the roof's leakage zone (if any) to the dye-containing water to permit penetration into the building's interior of enough water so as to be able to observe its fluorescent path of flow on the underside of the roof, its support structures, and/or the roof-penetrating structures. As with flat roofs, the wind-driven rain simulation techniques above described can be used on these types of roofs, also.

It will be appreciated from the foregoing that the invention herein can take many forms other than the preferred forms shown in the drawings and that the invention as herein claimed is not limited to the illustrated embodiments.

I claim:

1. A method for detection of an area or zone of water leakage through the roof of a walled or unwalled building, which comprises applying on all or part of a roof known to have, or suspected of having, water leakage therethrough a sufficient amount of water, having a fluorescent dye dissolved or dispersed therein, to cause said dye-containing water to flow through a roof leak point or zone onto the underside of the roof, and/or roof-penetrating structures, and/or roof support structures and/or the walls of the building beneath the roof, said fluorescent dye-containing water being applied in the form of a spray in a stream of air moving at a velocity of at least about 20 miles per hour; thereafter shining onto the underside of said roof, and/or said roof-penetrating structures, and/or said support structures and/or surfaces of walls of the building a light having a frequency band or spectrum which induces said dye to fluoresce; and tracing the path of fluorescence along the underside of said roof, and/or roof-penetrating structures, and/or roof support structures and/or the building wall to or near the point of origin of the area or zone of water leakage through said roof.

2. A method for detection of an area or zone of water leakage through the roof of a walled or unwalled building, which comprises applying on all or part of a roof known to have, or suspected of having, water leakage therethrough a sufficient amount of water, having a fluorescent dye dissolved or dispersed therein, to cause said dye-containing water to flow through a roof leak point or zone onto the underside of the roof, and/or roof-penetrating structures, and/or roof support structures and/or the walls of the building beneath the roof, said fluorescent dye-containing water being applied in the form of a jet spray of droplets of said dye-containing water having a velocity in excess of 10 miles per hour; thereafter shining onto the underside of said roof, and/or said roof-penetrating structures, and/or said support structures and/or surfaces of walls of the building a light having a frequency band or spectrum which induces said dye to fluoresce; and tracing the path of fluorescence along the underside of said roof, and/or roof-penetrating structures, and/or roof support structures and/or the building wall to or near the point of origin of the area or zone of water leakage through said roof.

3. A method as claimed in claim 1 or claim 2, wherein said dye is one which fluoresces under actinic light, and wherein said light has an actinic light frequency band.

4. A method as claimed in claim 1 or claim 2, wherein said dye is one which fluoresces under ultra-violet or black light, and wherein said light has an ultra-violet or black light frequency band.

5. A method of checking a roof of a building for water leakage which comprises dousing the entire roof, or part thereof, with water, having a fluorescent dye dissolved or dispersed therein, in an amount of said water sufficient to reasonably assure that the dye-containing water will flow through any leaks in said roof onto the underside of said roof and/or roof support structures beneath said roof and/or roof-penetrating structures, and/or the walls of said building beneath said roof, said fluorescent dye-containing water being applied in the form of a spray in a stream of air moving at a velocity of at least about 20 miles per hour, thereafter shining onto the underside of said roof and/or said support structures and/or the portions of said roof-penetrating structures beneath said roof, and/or surfaces of said walls, a light having a frequency band or spectrum which induces said dye to fluoresce, and ascertaining whether or not said roof has water leakage by projecting said light over the underside of said roof, its support structures, and/or said portions and/or at least the surfaces of the building walls contiguous to the roof to ascertain any presence of fluorescent dye thereon.

6. A method for checking a roof of a building for water leakage which comprises dousing the entire roof, or part thereof, with water, having a fluorescent dye dissolved or dispersed therein, in an amount of said water sufficient to reasonably assure that the dye-containing water will flow through any leaks in said roof onto the underside of said roof and/or roof support structures beneath said roof and/or roof-penetrating structures, and/or the walls of said building beneath said roof, said fluorescent dye-containing water being applied in the form of a jet or spray of droplets of said dye-containing water having a velocity in excess of 10 miles per hour, thereafter shining onto the underside of said roof and/or said support structures and/or the portions of said roof-penetrating structures beneath said roof, and/or surfaces of said walls, a light having a frequency band or spectrum which induces said dye to fluoresce, and ascertaining whether or not said roof has water leakage by projecting said light over the underside of said roof, its support structures and/or said portions and/or at least the surfaces of the building walls contiguous to the roof to ascertain any presence of fluorescent dye thereon.

7. A method as claimed in claim 5 or claim 6, wherein said dye is one which fluoresces under actinic light, and wherein said light has an actinic light frequency band.

8. A method as claimed in claim 5 or claim 6, wherein said dye is one which fluoresces under ultra-violet or black light, and wherein said light has an ultra-violet or black light frequency band.

9. A method as claimed in claim 5 or claim 6 wherein the presence of fluorescent dye is detected on at least one of the underside of said roof, its support structures and a building wall beneath said roof by the shining of said light thereon, and tracing the path of fluorescence along the underside of said roof, and/or roof-penetrating structures, and/or roof support structures and/or the building wall to or near the point of origin of the area or zone of water leakage through said roof.

* * * * *

UNITED STATES PATENT AND TRADEMARK OFFICE
CERTIFICATE OF CORRECTION

PATENT NO. : 4,317,996
DATED      : March 2, 1982
INVENTOR(S) : ROBERT E. DAVIS

It is certified that error appears in the above-identified patent and that said Letters Patent are hereby corrected as shown below:

Column 1, line 59, after "spraying" insert -- at a velocity in excess of 10 miles per hour -- ;

"   4,   "   9, "It" should be -- If -- .

Signed and Sealed this

Twenty-ninth Day of June 1982

[SEAL]

Attest:

GERALD J. MOSSINGHOFF

Attesting Officer    Commissioner of Patents and Trademarks